United States Patent [19]

Sicard

[11] 4,389,224
[45] Jun. 21, 1983

[54] METHOD AND APPARATUS FOR ACCRETING FIBROUS FILTER CARTRIDGES OR OTHER TUBULAR ARTICLES

[76] Inventor: Clarence Sicard, 31 Bradford Dr., Cheshire, Conn. 06410

[21] Appl. No.: 283,423

[22] Filed: Jul. 15, 1981

[51] Int. Cl.³ .............................................. B01D 27/02
[52] U.S. Cl. ................................... 55/55; 55/DIG. 5; 118/50; 118/423; 210/500.1; 427/294
[58] Field of Search ...................... 210/496, 497.2, 500, 210/505, 508; 118/50, 423; 427/295, 296, 294; 55/55, DIG. 5

[56] References Cited

U.S. PATENT DOCUMENTS

| | | | |
|---|---|---|---|
| 2,337,575 | 12/1943 | Sloan et al. | 210/496 X |
| 2,539,768 | 1/1951 | Anderson | 210/496 |
| 2,700,326 | 1/1955 | Curtis | 210/496 X |
| 2,906,367 | 9/1959 | Vandenburg | 55/55 |
| 3,073,735 | 1/1965 | Till et al. | 210/505 X |
| 3,995,076 | 11/1976 | Sicard | 427/295 |
| 4,032,457 | 6/1977 | Matchett | 210/505 X |

Primary Examiner—John Adee
Attorney, Agent, or Firm—Murray Schaffer

[57] ABSTRACT

An accreted batt is progressively vacuum formed about a porous or perforated member passing through an accretion zone under conditions where felting of the fiber occurs under a constant vacuum condition and a consolidation and dewatering zone wherein the batt is subjected to a separate but different vacuum condition. The two vacuum zones are spaced from each other by an air-water separation zone through which the mandrel passes and, in which, the liquid phase and air phase is substantially parted from each other. Each vacuum zone is energized by its own vacuum source, with the source for the accretion zone carrying away the water phase and the source for consolidation and dewatering zone carrying away the air phase from the separation zone.

26 Claims, 6 Drawing Figures

METHOD AND APPARATUS FOR ACCRETING FIBROUS FILTER CARTRIDGES OR OTHER TUBULAR ARTICLES

BACKGROUND OF THE INVENTION

The present invention relates to a method and apparatus of manufacturing accreted filter cartridges or other accreted tubular articles and, particularly, to a method and apparatus for progressively forming cartridge elements of bonded fibrous material which are rigid, self-supporting and porous.

In general, the conventional process for forming accreted filter cartridges followed the process disclosed in U.S. Pat. No. 2,539,768 (Anderson). Recently, in Sicard, U.S. Pat. No. 3,995,076, a method for progressively forming a fiber batt was disclosed. In this patent, accretion, consolidation and dewatering of the batt occurred under a single constant vacuum condition. A standpipe, closed at its upper end was vertically mounted in a vessel designed to hold a quantity of fiber slurry. The lower end of the stand pipe was connected to vacuum source such as a pump. The standpipe was formed with a single, perforated section, along its length, above and below the level of the slurry. This porous section was defined by flexible seals at its upper and lower edges. A cylindrical mandrel was coaxially placed over the standpipe and it was moved upwardly along the standpipe, cooperated with the seal rings to form an internal vacuum zone. Because the vacuum zone extended simultaneously below and above the slurry level, as the mandrel was raised, the fibers could be progressively accreted, consolidated and dewatered.

This process, while producing an excellent filter cartridge, has several disadvantages. One is the necessity of a reciprocating movement to lower the close fitting mandrel over the standpipe and then to raise it from the standpipe during the accretion, consolidation and dewatering cycle. Since the standpipe is fixed only at the bottom of the tank a very rigid and precise, and therefore expensive, mechanism is required to lower the mandrel over the standpipe to almost the bottom of the tank. To obtain this rigidity, a relatively large reciprocating mechanism is required as well as a relatively large tank to receive the mechanism. This large tank, of course, requires a large amount of slurry which must be kept agitated at all times. This is accomplished by the use of a large agitator located in the bottom of the tank or by a large flow of slurry directed against the bottom of the tank to establish upward circulation of the slurry towards the top of the tank where the vacuum induced felting takes place. Since the standpipe and vacuum station is in the center of the tank which is approximately 30" square most of the slurry rising along the perimeter areas of the tank only overflows back to the slurry pump for recirculation. From an energy standpoint, this is a very inefficient "brute force" approach. It requires a larger recirculation pump as well as a larger vacuum pump as fiber content seldom exceeds 1.0% (dry weight).

The high recirculation rate of the fiber slurry through the pump causes fiber abrasion and reduction in both fiber length and diameter and consequently on the filtration integrity of the finished filter. Also, the vertical fiber movement must be overcome by the vacuum pump suction before the fibers can be sucked onto the felting mandrel. This requires either a larger vacuum pump or larger felting time. Another factor governing overall cycle time is the need to insert the new mandrel gently over the standpipe to prevent damage to either part. This requires at least 50% of the time required for the upward filter forming stroke.

Another serious disadvantage of the prior art is caused by the physical dimensions of standard filter cartridges. These are roughly 1.065" I.D.×2.625" O.D.×multiples of 10" long up to a maximum of 40". Under these conditions, the I.D. of the standpipe is limited to about 0.8" which will handle a water flow sufficient to felt a cartridge in a reasonable length of time. However, when a mixed two phase flow (liquid and air) as in the prior art must be handled in this cross section, felting time will increase regardless of the vacuum pump size.

It is an object of the present invention to overcome the disadvantages of the prior art devices and, in particular, to eliminate the need to reciprocate the mandrel in the slurry bath thereby eliminating the large slurry tank and accompanying large recirculation pump or slurry agitator, whereby construction and operating costs are greatly reduced.

It is a further object of the present invention to provide a method and apparatus where accreted batts can be formed in an inline unidirectional process, without the need for reciprocal mandrel loading movement, thereby the process is simplified and the speed of production increased.

It is a further object of this invention to provide a method and apparatus wherein the accretion portion of the process and the subsequent consolidation and dewatering steps are physically separate and independent, each being subject to its own vacuum source. This results in significantly less vacuum power use and loss, overall, permits faster processing and ends in significant economic advantage.

The foregoing objects and advantages, as well as others, will become more apparent from the following disclosure of the present invention.

SUMMARY OF THE PRESENT INVENTION

According to the present invention, an accreted batt is progressively vacuum formed about a porous or perforated member passing through an accretion zone under conditions where felting of the fiber occurs under a constant vacuum condition and a consolidation and dewatering zone wherein the batt is subjected to a separate but different vacuum condition. The two vacuum zones are spaced from each other by an air-water separation zone through which the mandrel passes and, in which, the liquid phase and air phase is substantially parted from each other. Each vacuum zone is energized by its own vacuum source, with the source for the accretion zone carrying away the water phase and the source for consolidation and dewatering zone carrying away the air phase from the separation zone.

In the foregoing manner, the accretion steps and dewatering steps can be effectively separated so that accretion of a subsequent batt can be started before the preceding batt is totally dewatered. Also, the accreted batt is subjected to consolidation with a vacuum source not dependent upon the needs of accretion. The method, thus permits the continual indexing of mandrels through the vacuum zones so that a smooth unidirectional inline process is established allowing increased production and the advantages enumerated above.

According to the present invention, the apparatus comprises a generally vertically arranged cylindrical housing defining at its upper end an annular slurry tank and, in which, is located a coaxial standpipe. A small section between the bottom of the slurry tank and the upper level of the slurry defines an accretion zone in which this portion of the standpipe is provided with a plurality of holes. Below the accretion section, the standpipe is unperforated and terminates, in a swingable section, forming a loading zone. Above the level of the slurry, the standpipe has a solid wall, (i.e. it is not perforated) for a somewhat small section. This smaller, unperforated section, constitutes an intermediate passive air-water separation zone. Above this passive zone, the standpipe is again perforated for a given length which defines a consolidation and dewatering section.

A solid plug is secured within the interior of the standpipe at the slurry level dividing the standpipe into two discrete separate sections. Just above the plug, the standpipe is provided with a single ring of holes permitting drainage from the top down only.

Suction is provided for the accretion zone from the bottom end of the standpipe, while suction for the consolidation section is provided from the opposite or top end of the standpipe.

A perforated mandrel on which the cartridge is to be built is introduced over the standpipe at its lower end and is pushed upwardly progressively passing through the accretion zone, the passive air-water separator zone and the consolidation zone.

The apparatus requires a mandrel which has an unperforated handle of a length comparable to the accretion zone of the apparatus at its front end, and a flange at its rear end, the outer diameter of which conforms to the housing and an inner diameter conforming to the standpipe. Seals are provided on the inner and outer diameters of the flange.

A ring seal is mounted about the outer surface of the standpipe at the lower limit of the perforations in the standpipe of the accretion zone and is adapted to interpose itself between the mandrel and the standpipe, preventing slurry from being sucked into the mandrel from below the accretion station. No positive seal is used above this point, along the entire length of the standpipe.

Full details of the invention will be found in the accompanying description and will be seen in the accompanying drawings.

DESCRIPTION OF THE INVENTION

Turning first to a general description of the apparatus, the present invention employs a mandrel for supporting the batt during its formation which mandrel is passed successively through an inline vacuum accretion process formed by a series of contiguous, but independent stages, including a slurry bath, which under a given vacuum, causes the accretion of the fibers on the mandrel and thence, through a succeeding stage, open to ambient air, which under another given vacuum, causes the accretion to consolidate and be freed of water.

Figures 1, 2A:
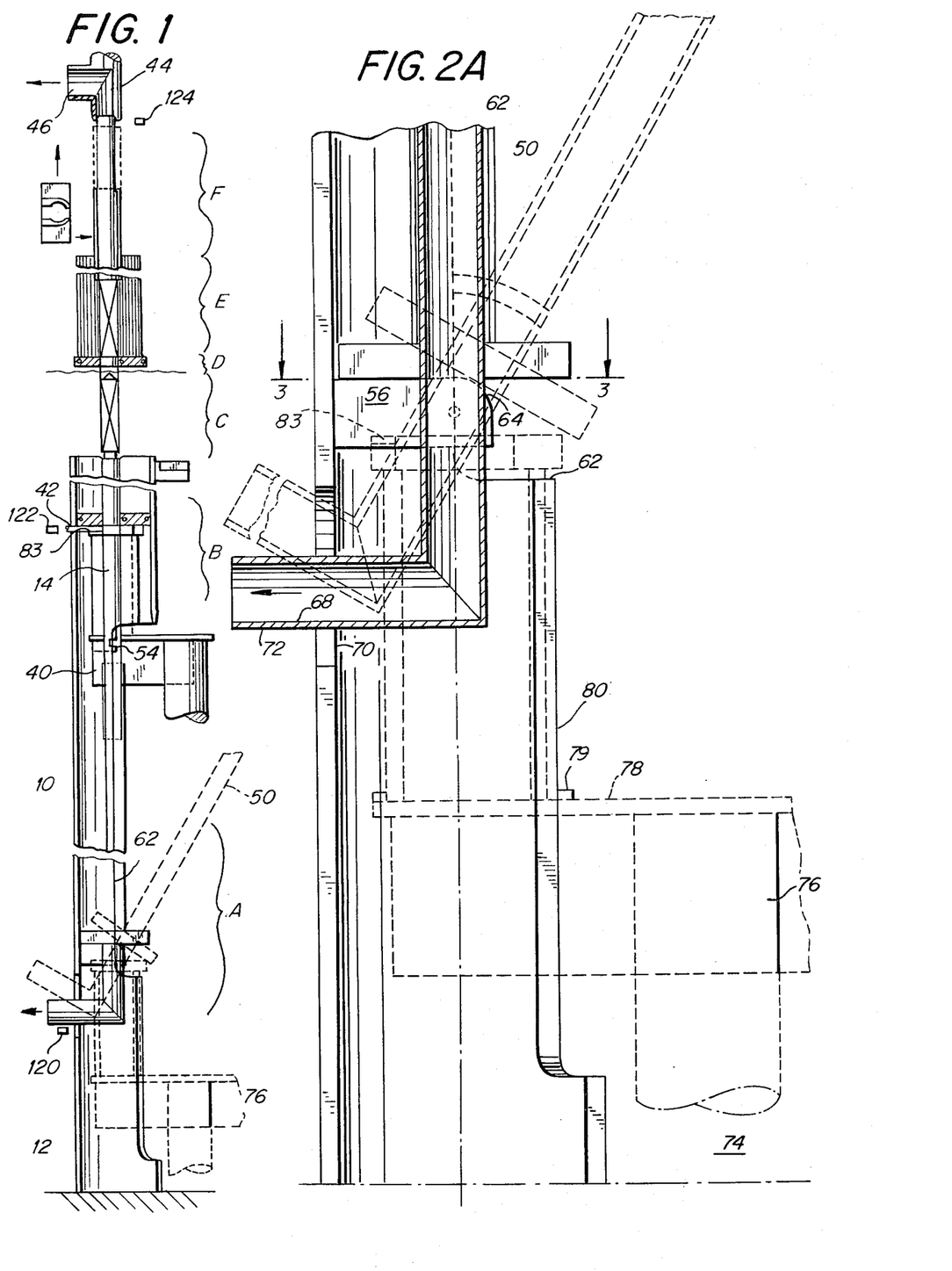
FIG. 1 is a sectional view in elevational cutting through the center line of the apparatus of the present invention in which the method thereof can be carried out.
FIG. 2A is an enlarged view of the lower portion of the apparatus shown in FIG. 1, showing the loading zone thereof.

The inline apparatus of the present invention, as seen in FIG. 1, comprises a mandrel intake or loading zone A, an intermediate holding or pre-accretion zone B, an accretion zone C, an air liquid separation zone D, a consolidation and dewatering zone E and a terminal removal zone F. Each of the zones, A and B is defined along a vertically disposed tubular outer housing 10, the lower end of which comprises a hollow pedestal which is supported on a base 12. Each of the zones C, D, E and F, is defined along a standpipe 14, which extends coaxially through the open top end of the housing. A mandrel on which the batt is formed is adapted to be loaded sequentially onto a pivotal arbor section of the standpipe, in the intake zone and pushed upward over the standpipe within the housing by a piston assembly so that each mandrel passes through each of the zones successively.

The standpipe is normally held in coaxial positon by a latch mechanism 42 which is removable during operative processes and by the mouth 44 of suction nozzle 46 at its upper end.

The latch mechanism 42 is located at the upward end of Zone B and actuated from the exterior of the housing. The latches move inwardly in opposition to each other to clamp against the outer surface of the standpipe 14, and outwardly to at least the inner surface of the housing 10, to be flush with it, so as to permit the flange of the mandrel to pass freely when the latch is in open position. The latch mechanism may comprise, for example, three fingers articulatingly connected to actuating linkage such as might be employed to form an iris or shutter assembly. The upper end of the standpipe 14 is centered by the mouth 44 of a suction nozzle 46, which will be further described later.

The standpipe 14 is, during accretion operation, held in fixed vertical and horizontal position by engagement with the matching key shaped cut-outs 54 in the lower end 40 of the standpipe and the upper end 52 of the tubular loading arbor 50 which cooperate in the closed position to form a tight continuation of the standpipe.

On loading a subsequent mandrel the piston is retracted. The loading arbor is rotated outwardly to accept a new mandrel which is slid downward over the loading arbor which can now be rotated back to its normal position to once again engage the standpipe. During this time the latch mechanism holds the standpipe together with the mandrel previously moved into the holding zone B which may have already opened the latching mechanism but now holds the standpipe 14 in fixed vertical and horizontal position and also supports the weight of all the prior mandrels in various stages of manufacture. The piston can now be advanced, the latches retracted as the unperforated handle end approaches the prior mandrel already in Zone B and a new cycle is started.

Figures 3, 4:
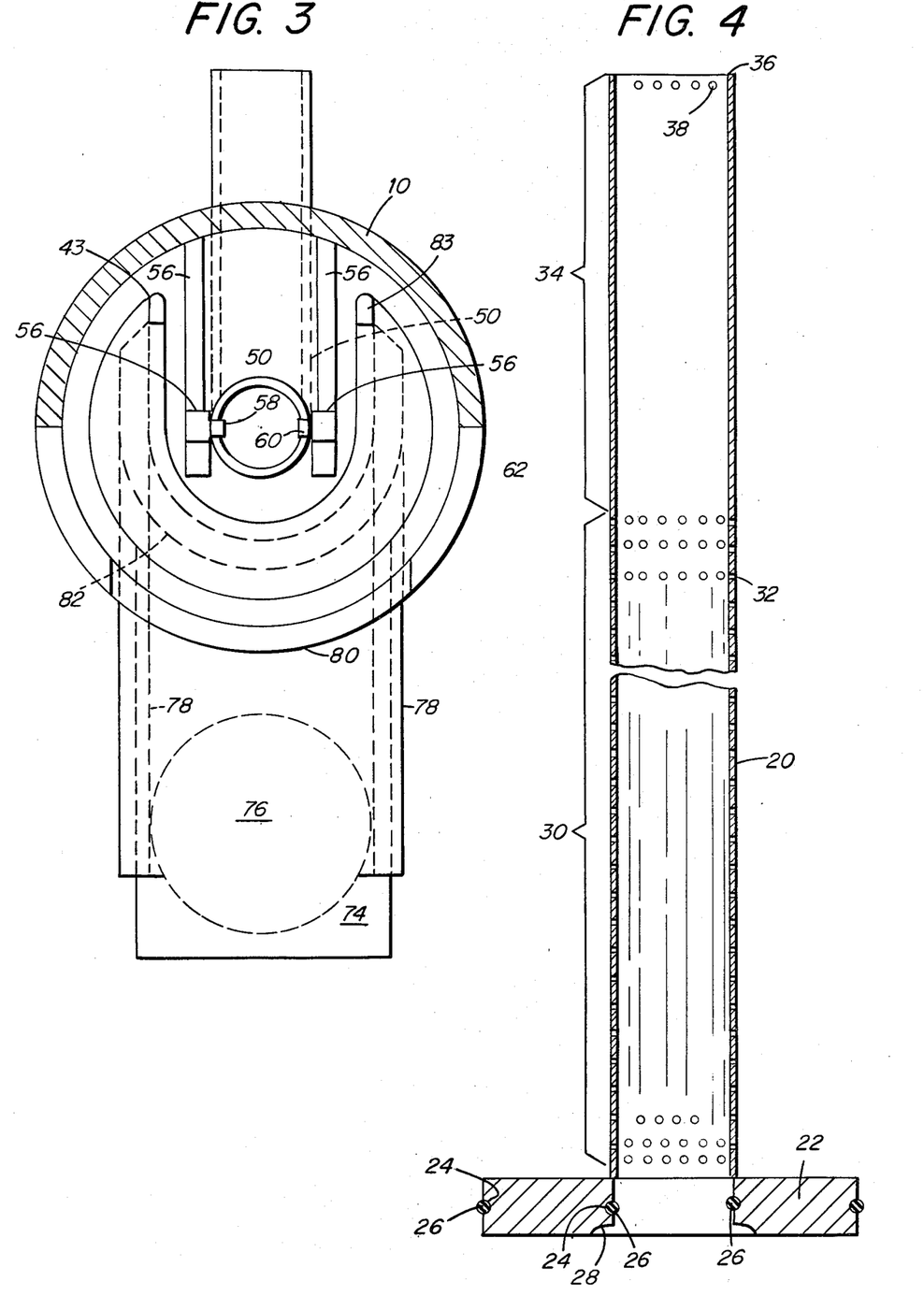
FIG. 3 is a sectional view along lines 3—3 of FIG. 1.
FIG. 4 is an enlarged view of the mandrel on which accretion is accomplished.

As seen in FIG. 4, the mandrel comprises an elongated tube, generally depicted by the numeral 20, the rear end of which tube is sealed by disk-like flange 22, having a groove 24 in both its inner and outer peripheral edges into each of which is fitted an elastic seal 26. The rear face of the flange is provided with a shallow truncated conical under-cut 28 the base of which is radially flat and of a dimension substantially equal to the diameter of the mandrel tube 20. That portion 30 of mandrel tube 20, extending from the flange, corresponding to the length of the desired accreted batt (preferably at least equal to a multiple of the cartridges ultimately desired), is perforated with a plurality of holes 32. The holes 32 may be made in a random pattern or any predefined pattern as desired provided they are sufficient in number and size to effect the suction accretion of the fibers, as will be discussed hereinafter.

The forward portion 34 of the mandrel tube is unperforated and is generally intended for forming a handle and to provide intermediate space between the batts on tandemly arranged mandrels, as will be also described later. The forward edge 36 of the mandrel tube is provided with holes 38 which, as will also be described later, form an opening.

The mandrel is preferably made of stainless steel to permit extensive reuse and avoid corrosion and possible staining of the accreted batt. It may be made of other material of equal strength and corrosion resistance, if desired.

The inner diameter of the housing and the outer diameter of flange of the mandrel are substantially equal, and the ring 26 serves to form a movable seal therebetween which acts to prevent leakage of slurry therebetween. The inner diameter of the mandrel tube is slightly larger than outer diameter of the standpipe to permit close sliding contact therebetween.

Figures 2B, 2C:
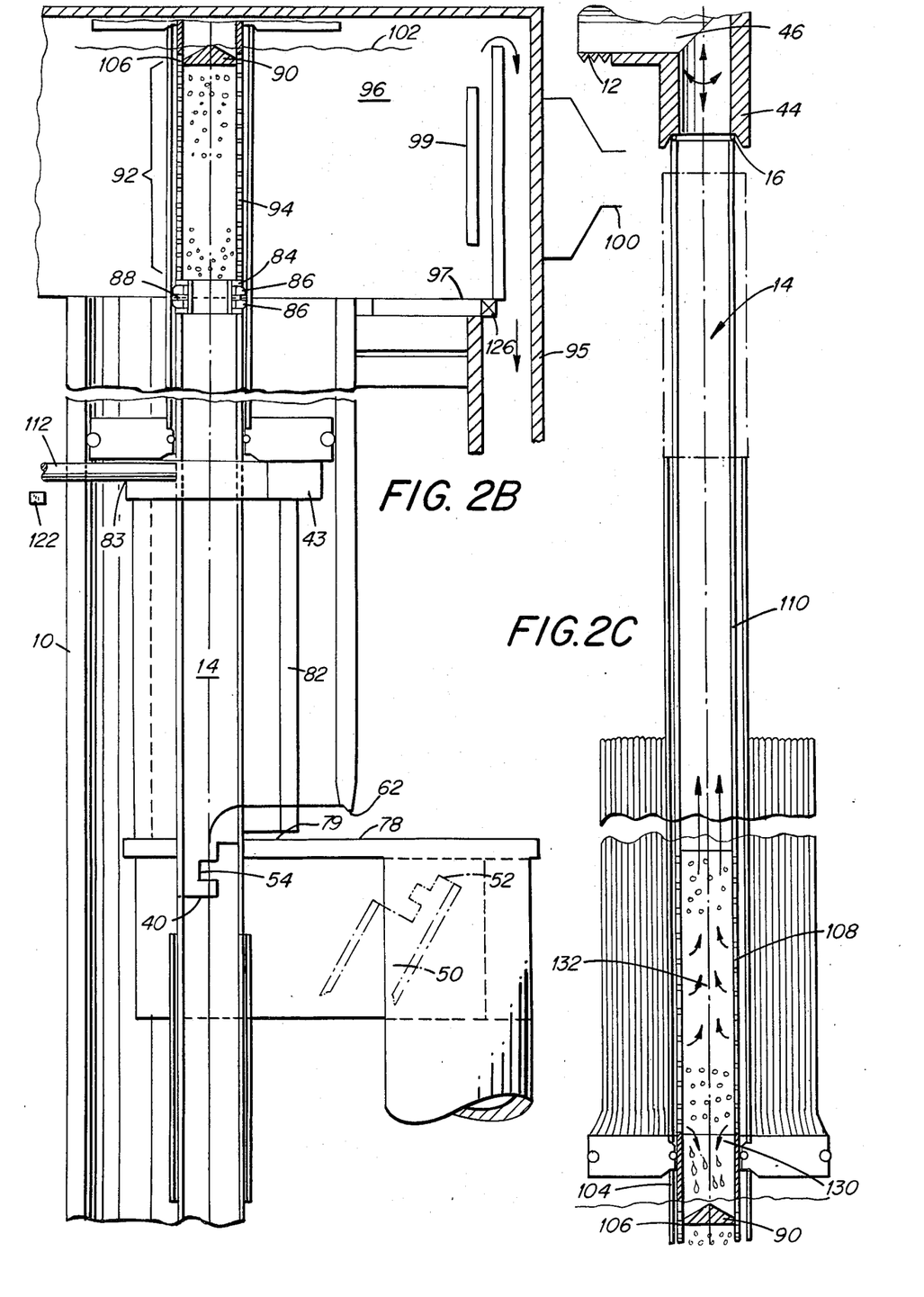
FIG. 2B is an enlarged view of the central portion of the apparatus shown in FIG. 1, illustrating the holding and accretion zones.
FIG. 2C is an enlarged view of the upper portion of the apparatus shown in FIG. 1 showing the dewatering, consolidation and removal zones.

As seen in FIGS. 2 and 3, the loading arbor 50 is journalled on a pair of spaced horizontal support posts 56 welded to the interior surface of the housing. The posts are provided with inwardly opposed axle pins 58 entering corresponding holes 60 in the arbor. The housing 10 is cut out to form a window 62, the length of the pivotal arbor in that semi-circular sector parallel to the pivot axis of pins 58 so that the loading arbor can be swung outwardly of the housing, permitting an accretion mandrel 20 to be placed thereover. The upper edges of the horizontal support posts 56 are bevelled to provide a quarter round edge 64 which forms an abutment surface for the flange of the mandrel.

The lower end 66 of the loading arbor is provided with a short perpendicular tubular extension 68, passing through a slot 70 formed in the opposite side of housing, to which a section of flexible hose 72, connected to a vacuum pump (not shown) is attached.

Mounted adjacent the housing 10, is a hydraulic or pneumatic cylinder 74 and piston 76 having a stroke extending from about the bottom of the housing to a point above the lower end 40 of the fixed standpipe. Attached to the piston 76 are a pair of parallel arms 78 which extend chordally through a second window 80 of narrower sector below the window 62 for the loading arbor. Mounted on the arms 78, is a cover plate 79 supporting an axially elongated member 82 to which is fastened latch flange 43 both of generally horseshoe cross-section, having an axial length substantially equal to the distance between the lower end 40 of the fixed standpipe 14 and the latch assembly 42. The bight of the members 79, 82 and 43 is such that its arms surround the posts 56 and loading arbor 50 and are, thereby, movable axially within the housing.

The piston 74 is adapted to be operated when the pivotal loading arbor 50 is moved into registry with the standpipe 14 to move the horseshoe-shaped members 82 and 43 upwardly, forcing any mandrel previously placed on the arbor upwardly into the holding zone B. The upper edge of the horseshoe-shaped member 43 is provided with cutouts 83 into which fit the latch members of the latch assembly 42. This permits the latch assembly to close about the standpipe 14 once the horseshoe-shape member reaches its upper limit and prior to its return or descent into its rest position.

The holding zone B, FIG. 2B, defines an annular chamber between the inner wall of the housing 10, which is smooth and unperforated, and the standpipe 14 which is also smooth and unperforated, lying between the latch assembly 42 and the accretion zone C at the upper end. At the boundary between the holding zone and the accretion zone, the standpipe 14 is provided with an annular reduced neck 84 in which a pair of expansion type seals 86, such as C-rings, spaced by C-ring spacer 88 are located. The radial extension of the expansion seals, in their uncompressed state, is greater than the outer diameter of tube so that on passage of the mandrel over it, it is compressed, producing an inner seal to the interior surface of the mandrel tube.

The accretion zone C is defined by the plane passing through the C-ring seals and a plug 90 secured within the standpipe 14 as by welding or the like. Thus, the standpipe 14, within the accretion zone C, is in communication with the standpipe section in the holding zone B while the upper end, defined by the plug 90, is blocked and closed to the upper remainder of the standpipe above it, except for drainage holes 106 located below the slurry level. Consequently, no air can pass through the standpipe between sections above or below the plug 90. The section 92 of the standpipe within the accretion zone is provided with a plurality of slots 94 or holes which may be randomly applied or applied in a pattern. Preferably, the slots 94 are sufficient in number to provide free passage of fiber depleted slurry therethrough.

Extending concentrically about the accretion zone is a radially enlarged cylinder 95 forming a slurry reservoir 96 fastened by flanges or other means to the upper end of the cylindrical housing 10. The cylinder 95 is closed by a bottom wall 97 in a plane with the expansion seals 86. The cylinder is provided with an inner side wall 98 which extends upwardly to a point just above the plug 90 while the outer side wall of the cylinder 95 is somewhat higher, thus forming an overflow drain, indicated by the arrow. An inlet duct 99 passes tangentially through the wall of the cylinder 95, behind the wall 98 so that slurry can be fed into the reservoir formed by the inner wall.

The duct 99 is fed through a conduit 10, from a source with a supply of slurry consisting of the usual mixture of water, and fibers (resin and other ingredients, if desired) as is known and conventional in this art. Preferably, the slurry is pumped so that it is fed under pressure, whereby its tangential entry into the reservoir creates a centrifugal flow about the central axis defined by the standpipe 14, maintaining the slurry homogenous without the need of agitators or mixers.

Excess slurry spills over the inner wall 98 and is drained by suitable hosing to the source of slurry. In this manner, the level of slurry 102 within the accretion zone can be maintained substantially constant, no matter what the flow rate or volume of slurry is, or the amount of slurry utilized during the accretion process.

The air-liquid separator zone D (FIG. 2C) is located just above the plug 90 and is constituted by a section 104 of the standpipe which is unperforated, except for a few small drainage holes 106 at the lower boundary edge just above the plug 90. The small holes 106 permit seepage of slurry from above the plug 90 back into the accretion zone. To assist this seepage, the plug 90 is formed with a conical top.

The consolidation and dewatering station E is formed just above the air-water separator. In this zone, the standpipe section 108 is perforated again with a plurality of slots or holes of selected configuration.

In the terminal and removal zone F, just above the consolidation and dewatering zone, the standpipe section 110 is solid, i.e. unperforated.

The extreme upper end 16 of the standpipe 14, as previously indicated, is centered by the mouth 44 of the suction nozzle 46, which is connected by suitable flexible hose 112 to a source of suction such as a pump (not shown). The nozzle 46 is mounted by known means so as to be liftable from the end of the standpipe and revolvable about a vertical axis offset from the standpipe so as to swing away from registry with it permitting the mandrel to be removed from the standpipe. The mandrel may be removed manually by its handle or mechanically by automatic means which grasp and lift it off the standpipe.

Before proceeding to describe the operation of the apparatus and the method for forming the completed cartridge, it will be noted that both the lower and upper ends of the standpipe are provided with sources of suction, which create suction zones, totally independent and separated from each other by the cooperation of the plug located in the standpipe and the ring seals mounted on the flange of the mandrels.

While separate sources of suction are preferred, it is clear that a single source such as a pump can be used in cooperation with a manifold or set of valves so that the supply to the individual zones can be separated and levels of suction can be varied dependent on the need.

The apparatus may be operated in a basic manual mode or it can be automated with a variety of controls, motors, sensors, etc., which are common in this field, and well known to those skilled in this art, so that they need not be described in detail here.

To insure proper operation, however, the apparatus should be provided with at least a micro-switch 120 located to sense closing portion of the arbor 50 and thereby signal the fact that suction may be applied to the lower end of the standpipe; a micro-switch 122 at the level of the latch assembly to sense the upward limit to the stroke of the piston; and, a micro-switch 124 at the upper end of the standpipe to sense the reaching of the handle of the mandrel at that end.

Prior to placing the apparatus in operation, no slurry is supplied to the accretion zone. This can be accomplished by control of the supply pump from the source to the reservoir or through the use of appropriate manual valving. A valve 126 can be placed in the bottom wall 96 of the reservoir to drain it. Vacuum is not supplied either to the lower end of the standpipe or the upper end of the standpipe. The loading arbor 50 is opened, that is, it is pivoted outwardly of the window 62 as seen in dotted lines. The piston 76 is in its rest or retracted or down position.

The apparatus is initially placed into operation by placing a mandrel tube 20 with its flanged bottom 22, down onto the outwardly pivoted loading arbor 50 until it abuts the rounded stop edge 64 of posts 56. The loading arbor 50 is then swung into registry with the standpipe 14 activating the micro-switch 122, which in turn can cause automatic suction through the lower end 68 of the standpipe and activation of the cylinder 74 causing the piston 76 to rise resulting in the horseshoe members 82 and 43 pushing the mandrel tube 20 up the standpipe 14. As the mandrel tube rises, the latch assembly 42 is opened to permit it to pass. As the flanged bottom 22 of the mandrel tube passes the upper edge of the window 62, the O-rings 26 on the outer peripheral edge engage the inner wall of the housing forming a tight frictionally engageable but sliding seal therewith, which coupled with the same type of seal made by the rings 26 on the inner peripheral edge with the standpipe results in a firm grasp of the standpipe relative to the housing, and a seal against any loss of fluid downwardly through the housing 10.

The piston 76 rises until it has pushed the mandrel tube 20 completely above the level of the latch assembly 42. In this position, the horseshoe-shaped member engages the micro-switch 122 which then activates the latch assembly 42 to close, the latches entering the cutouts 83 at the top of the horseshoe-shaped member. The unperforated handle portion 34 of the mandrel tube completely enters the accretion zone C and covers the perforated section 92 of the standpipe in this zone. The leading edge of the perforated portion 30 of the mandrel tube is at the point where the expansion seals 86 are mounted about the standpipe. It is, of course, understood that the handle, the perforated section of standpipe, and the stroke of piston are all respectively dimensioned so that these elements correlate to take the positions described.

Once the initially introduced mandrel tube takes the position indicated, the piston 76 is retracted, moving to its downward limit and the loading arbor 50 is then pivoted outwardly, the micro-switch 120 causing deactivation of suction. Because of the axial length of the horseshoe-shaped arms 82, the loading arbor 50 is prevented from opening until the piston is fully retracted. Simultaneously slurry can be introduced to the reservoir 96. The slurry initially fills not only the accretion zone C but also the area of the holding zone B surrounding the mandrel tube located therein. In this position, even if suction were applied to the accretion zone, no felting could take place since the handle portion 34 of the mandrel tube covers the only perforated portion 92 of the standpipe below the center plug 90. However, when the loading arbor is open, no vacuum is applied to the lower end of the tube. It is understood that after the initial mandrel is inserted and the slurry flow begins, there is no need to discontinue the slurry feed for any reason short of totally stopping the use of the apparatus.

Following this, a second mandrel tube is placed over the open loading arbor which, as previously described, is then closed, and the second mandrel moved up the standpipe by actuation of the piston 76. Once the second mandrel begins its upward movement, vacuum is applied from below through hose extension 68 from the vacuum source, applying a suction load to the entire standpipe 14 up to the central plug 90.

As the second mandrel moves upwardly, its forward edge 36 enters into the under cut 28 on the rear face of the flange 22 in the preceding mandrel tube, placing it in tandem therewith. The stroke of the piston 76, as previously described, is such that the second mandrel tube pushes not only the second mandrel but also the preceding mandrel up through and past the accretion zone C. As this occurs, the perforated section 30 of the mandrel tube begins to register with the perforated section 90 of the standpipe 14, and due to the presence of slurry and vacuum, felting proceeds on this portion of the mandrel tube.

As the mandrel tube within the accretion zone rises, the slurry in the holding zone B is lifted up into the accretion zone C, where any excess over flows and returns to the source. Once the flange 22 of the upper mandrel passes the bottom wall 97 of the reservoir 96, the accretion zone C and the holding zone B are again in communication and slurry returns to the holding zone. This, however, is held therein because the succeeding or second mandrel has already entered the holding zone where its flanged bottom again seals that zone with its O-rings. The movement of slurry back into the holding zone causes only a momentary release of the slurry from the accretion zone which is immediately made up by the introduction of slurry from the over abundance in the reservoir.

It should be noted that the slurry in zone B is gradually pushed upwards and contributes its fibers to the felting operation. It also provides an upward vector to the existing slurry in the tank to guarantee a thorough mix of the slurry directly at the point of felting.

In the foregoing manner, the forward mandrel tube passes through the accretion zone where its length is accreted with fiber, while simultaneously the next mandrel tube moves to replace it in the holding position shown.

As the forward mandrel with the accreted fiber batt passes upwardly out of the accretion zone it moves past the plug 90 and into the air-water separator zone D, which, because the standpipe at this zone is not porous, the fiber batt is not subject to any positive or direct air flow from the vacuum source applied through nozzle 46 to the upper end of the standpipe, although such supply can be continuous. It should be noted that a small amount of air is continuously being sucked into the annulus between the standpipe and the mandrel because there is no upper seal between the two. This flow maintains a negative pressure on the accreted and consolidated batt thereby holding the fibers in place and continuously dewatering them during their entire travel above the slurry level. During this relatively short traverse through the air-water separator zone, the batt drains some of the excess slurry through the annular space between the mandrel tube and the standpipe and undergoes a dwell period in which the fibers settle into position.

As will be seen, the actual accretion or felting of the fibers takes place between the expansion type seals 86 and the upper level of the slurry or plug 90. No upper seal is required, since air cannot enter into the perforated section of the standpipe in the accretion zone from above due to head of slurry located above the plug. The lower seal is necessary only to prevent the slurry from falling downwardly between the mandrel and the standpipe and forces the direction of accretion indicated by the arrows 120.

In the air-water separator zone D, where the standpipe is unperforated, the interior of the standpipe is subjected to an indirect vacuum derived from the top end of the standpipe. Due to the gravitational forces acting on the liquid and air, coupled with the upward pull of the vacuum, the air is caused to generally rise while the liquid falls. Thus, only liquid from the slurry, or excess water from the separator zone appears between the inner surface of the mandrel tube and the standpipe at the plug level of the accretion zone, at all times, without the same being actually sealed at its upper boundary.

When the mandrel and the batt pass into the consolidation and dewatering zone E, the batt undergoes strong application of vacuum, as is then applied through the upper end of the standpipe. The fibers are thus progressively consolidated and densified reducing the overall diameter of the batt, and drawing the water from the batt into the center of the standpipe. The water falls, as indicated by the arrows 130 in FIG. 2C onto the conical top of the plug 90 and through the drainage holes 106 into the annulus between the mandrel and the standpipe and then into the lower standpipe by means of the accretion zone. The air 132 drawn in with the water through the consolidated batt rises into the upper vacuum source.

When the flange 22 on the bottom of the mandrel tube reaches the top of the air-water separator zone, the succeeding mandrel, that is the one pushing the forwardmost mandrel, has reached the position shown in FIG. 2B wherein its handle section 34 overlies the perforations 92 in the accretion zone C of the standpipe. Thus, accretion is effectively stopped, even if suction continues to be applied from the lower end of the standpipe. In this position, the piston 76 has also reached the upward limit of its stroke, and must return downwardly. Actually, the movement of the mandrel tubes within the housing is momentarily arrested. This provides the time to stop the application of vacuum to the lower end of the standpipe without interruption of any accretion step during actual accretion and permits reloading of the apparatus with a new mandrel tube, which is of course, done in the manner described heretofore. Vacuum continues to be applied from the upper vacuum source to continue dewatering of the batt momentarily arrested at zone E. Since the apparatus is arranged vertically, the water in the batt tends to fall toward the flange end of the mandrel and this seeming excess of dewatering actually removes excess moisture as a result of which, the "Christmas" tree effect found in prior processes is avoided.

Once a third (or subsequent) mandrel is loaded, it is pushed upward as before, moving ahead of it the second mandrel, which then passes the accretion zone, to which suction is then applied, and a batt is felted on to this second mandrel.

The second mandrel tube then, in turn, pushes the first mandrel from the consolidation zone E into the terminal and removal zone F, until the second mandrel tube sits fully in the consolidation and dewatering station D and the third at the holding station. The piston 76, then having reached its upper limit, retracts downwardly and the process is repeated, by introduction of a new mandrel tube.

As the first of forwardmost mandrel tube fully enters into the terminal and removal zone F, if desired to enhance drying, warm air can be blown across its surface. Once the complete batt and mandrel comes to rest in the terminal and removal zone F, and the forward edge reaches the micro switch, it is ready for removal.

Upon activation of the micro switch 124, suction is interrupted from the top and the nozzle 46 is lifted off the end of the standpipe and rotated out of alignment therewith. The finished batt is then removed either manually or automatically by appropriate means. Removal of the complete batt is accomplished during that interval when the movement of the succeeding mandrels is such that the handle section of the mandrel at the accretion zone is itself passing through the air-water separation zone D. Under this condition, the removal of vacuum from the upper end of the standpipe has no effect on the cycle since dewatering of preceding batt has been effectively completed.

The cycle of operation can be endlessly repeated, without major interruption, since the supply of mandrels, and slurry can be made endless.

Various modifications, embodiments and changes have been disclosed herein; others will be obvious to those skilled in this art. Accordingly, it is to be understood that the present disclosure is to be taken as illustrative only and not limiting of the scope of the present invention.

What is claimed is:

1. A method of forming an acreted fibrous batt comprising the steps of passing a porous mandrel in a continual sequence through a unitary tubular housing defining first zone containing a slurry of fibrous material, an intermediate zone and a second zone each free of slurry, applying a vacuum under constant conditions to each of said first and second zones independently of each other to felt said fibers on said mandrel in said first zone and dewater said felted member in said second zone, and regulating the flow of vacuum from said first and second zones into said intermediate zone to separate the water removed from said felted member into its liquid and air phases.

2. The method of forming an acreted fibrous batt comprising the steps of disposing a porous mandrel about a vertically arranged vacuum standpipe mounted coaxially within a cylindrical housing having a tank containing an aqueous slurry of fibrous material at its upper end, a plug located within said standpipe sealingly dividing the interior of said standpipe into two sections substantially along the level of the slurry, its lower section having a porous area within said tank defining a first zone containing a portion of said slurry, the upper section having a porous area defining a second zone free of said slurry and being axially spaced from the upper level of said slurry to define therebetween an intermediate zone, introducing a vacuum at each end of said standpipe, advancing said porous member from the lower end of said standpipe to the upper end thereof to progressively acrete on said mandrel a batt, separate the water and air phases and consolidate and dewater the batt.

3. The method according to claim 2 including the step of passing said liquid phase into said first zone and said air phase into said second zone.

4. The method according to claim 3 including the step of sealing the porous member with respect to said standpipe and said housing.

5. The method according to claim 4 including the step of supplying a substantially continuous stream of porous members and moving said members endwise through said zones.

6. The method according to claim 5 including the step of sealing each succeeding member from the preceeding member.

7. Apparatus for forming an acreted batt of fibrous material on a porous member comprising a vertically arranged vacuum standpipe, a housing coaxially surrounding in part said standpipe and having a tank for containing an aqueous slurry of fibrous material at its upper end surrounding said standpipe, a plug located within said standpipe sealingly dividing the interior of said standpipe into two sections substantially along the level of the slurry in said tank, the lower section having a porous area within said tank defining an acretion zone, the upper section having a porous area spaced axially above the level of slurry defining consolidation and dewatering zone, the portion of said standpipe between said porous areas being unperforated and defining an intermediate zone for separation of the air and water phases, means for applying a vacuum at each end of said standpipe, means for introducing the porous member to the lower end of said standpipe and means for progressively advancing said porous member through said acretion, air and water phase separation and consolidation and dewatering zones.

8. The apparatus according to claim 7 wherein said porous member comprises a tubular perforated arbor having an annular flange at its lower end, said flange being provided with means for forming a sliable seal with the exterior surface of said standpipe and the interior surface of said housing, to prevent leakage of slurry therebetween.

9. The apparatus according to claim 8 wherein said arbor includes an unperforated tubular extension at its upper end.

10. The apparatus according to claim 9, wherein the annular flange is provided with a conical recess about its central opening adapted to receive the end of said unperforated tubular extension.

11. The apparatus according to claim 8 wherein said standpipe is provided with an annular seal at the lower end of the porous area within said tank, said seal coacting with the interior of the arbor of said porous member to prevent flow of slurry therebetween and to define the lower limit of the acretion zone.

12. The apparatus according to claim 11 wherein said annular seal comprises a pair of annular ring seals separated by a rigid spacer, said standpipe being provided with a neck-down portion forming a recess for said seal.

13. The apparatus according to claim 7 wherein said tank is annular and includes a tangential inlet and means for continuously supplying slurry through said inlet at a rate sufficient to constantly agitate the slurry therein.

14. The apparatus according to claim 13 including overflow means for causing the discharge of slurry from said tank when said slurry reaches the level of the plug.

15. The apparatus according to claim 7 wherein the means for introducing the porous arbor to said standpipe comprises a hollow pipe pivotally mounted below said standpipe and movable between a first position extending angularly thereto to permit placement of said porous arbor thereon, and a second position in axial registry with said standpipe to permit movement of said porous arbor onto said standpipe.

16. The apparatus according to claim 15 wherein said pivotal pipe is mounted on a bearing shaft located within said housing, said housing being provided with a cut-out window permitting pivoting of said pipe.

17. The apparatus according to claim 16 wherein said bearing is provided with a beveled upper edge permitting seating of said porous arbor thereon.

18. The apparatus according to claim 16 wherein the means for applying a vacuum to the lower end of said standpipe comprises a tubular extension formed at the end of said pivotal pipe adapted to be connected to a conduit connected to a source of vacuum.

19. The apparatus according to claim 16 wherein said means for pushing said porous member comprises a cylinder and piston assembly, said piston having a U-shaped member at its upper end adapted to fit within the window of said housing and engage the bottom of the flange of said porous member, said piston being movable therein to straddle said bearing, and said pipe, said piston being reciprocable parallel to the axis of said standpipe.

20. The apparatus according to claim 18 including means at the lower end of said standpipe and the upper end of said pivotal pipe to cooperate and seal said pipes and standpipe in registry.

21. The apparatus according to claim 7 including latch means located along said housing to grasp said standpipe, said latch means being movable into engagement with said standpipe in the absence of a porous member adjacent thereto, and out of engagement therewith in the presence of a porous member.

22. The apparatus according to claim 7 wherein the means for applying a suction to the upper end of said standpipe comprises a tubular head, having an opening adapted to fit over the end of said standpipe in sealed registry therewith and conduit means for connection to a source of vacuum.

23. The apparatus according to claim 22, including means for moving said head in a first direction axial of said standpipe and a second direction angularly about the axis of said standpipe to remove said head from standpipe to permit removal of said porous member therefrom.

24. The apparatus according to claim 23 including means for grasping said porous member for removal from said standpipe.

25. The apparatus according to claim 17 wherein said plug has a conical upper surface, and said standpipe is provided with at least one hole directly above said plug to permit flow of the liquid phase from the interior of said standpipe.

26. A method of semi-continuously forming accreted fibrous batts comprising the steps of a unidirectional moving foraminous mandrels along a tubular housing, preceeding successively from a mandrel loading zone, to a holding zone to a felting zone consisting of a slurry tank with a first vacuum station, to a air-water separating zone, and thereafter to a final batt removing zone, to produce a semi-continuous flow of felted batts, where the introduction of each new mandrel into the loading zone forces the ejection of a felted cartridge from the opposite end of the apparatus.

* * * * *